US012789173B2

(12) United States Patent
Abualrejal et al.

(10) Patent No.: US 12,789,173 B2
(45) Date of Patent: Nov. 10, 2026

(54) MULTIDIMENSIONAL MULTILAYERED UPCONVERSION NANOARCHITECTONICS WITH TUNEABLE Nd CONTENT FOR EFFICIENT PHOTOCATALYTIC PHENOLIC DEGRADATION UNDER AMBIENT CONDITIONS

(71) Applicant: QATAR UNIVERSITY, Doha (QA)

(72) Inventors: Murad Abualrejal, Doha (QA); Kamel Abdelmoniem Mohamed Eid, Doha (QA); Aboubakr Moustafa Abdullah, Doha (QA); Halema Al-Kandari, Faiha (KW); Shekhah Al-Kandari, Safat (KW); Ahmed Mahmoud Abdelgwad, Doha (QA); Gehyath Khaled Masrallah, Doha (QA)

(73) Assignee: QATAR UNIVERSITY, Doha (QA)

( * ) Notice: Subject to any disclaimer, the term of this patent is extended or adjusted under 35 U.S.C. 154(b) by 674 days.

(21) Appl. No.: 18/202,711

(22) Filed: May 26, 2023

(65) Prior Publication Data

US 2023/0381756 A1 Nov. 30, 2023

Related U.S. Application Data

(60) Provisional application No. 63/346,270, filed on May 26, 2022.

(51) Int. Cl.
*B01J 27/138* (2006.01)
*B01J 27/125* (2006.01)
(Continued)

(52) U.S. Cl.
CPC ........... *B01J 27/138* (2013.01); *B01J 27/125* (2013.01); *B01J 35/39* (2024.01); *B01J 35/398* (2024.01);
(Continued)

(58) Field of Classification Search
CPC ........ B01J 27/138; B01J 27/125; B01J 35/45; B01J 35/398; B01J 35/53; B01J 35/505; B01J 37/0221; B01J 37/0228; B01J 37/0244; B01J 2235/30; B01J 2235/00; B01J 2235/15; C02F 1/30; C02F 1/725; C02F 2101/308; C02F 2101/345; C02F 2305/08; C02F 2305/10; C09K 11/7773
See application file for complete search history.

(56) References Cited

U.S. PATENT DOCUMENTS

2010/0261263 A1* 10/2010 Vo-Dinh .................. A61L 2/08
977/773

FOREIGN PATENT DOCUMENTS

CN 108273530 A 7/2018

OTHER PUBLICATIONS

Bing Xu et al., "Nd3+ sensitized dumbbell-like upconversion nanoparticles for photodynamic therapy application", Journal of Materials Chemistry B 2016, 4, 2776-2784, Royal Society of Chemistry, DOI: 10.1039/c6tb00542, 9 pages.
(Continued)

*Primary Examiner* — In Suk C Bullock
(74) *Attorney, Agent, or Firm* — Hodgson Russ LLP

(57) ABSTRACT

Provided herein are multilayered, multidimensional upconversion nanomaterial compositions and methods. In certain aspects and embodiments, the compositions and methods are useful in the photolytic degradation of a phenolic pollutant (e.g., phenol).

6 Claims, 13 Drawing Sheets

(51) Int. Cl.

| | |
|---|---|
| ***B01J 35/30*** | (2024.01) |
| ***B01J 35/39*** | (2024.01) |
| ***B01J 35/45*** | (2024.01) |
| ***B01J 35/50*** | (2024.01) |
| ***B01J 35/53*** | (2024.01) |
| ***B01J 37/02*** | (2006.01) |
| ***C02F 1/30*** | (2023.01) |
| ***C02F 1/72*** | (2023.01) |
| ***C09K 11/77*** | (2006.01) |
| *C02F 101/30* | (2006.01) |
| *C02F 101/34* | (2006.01) |

(52) U.S. Cl.

CPC ............. *B01J 35/45* (2024.01); *B01J 35/505* (2024.01); *B01J 35/53* (2024.01); *B01J 37/0221* (2013.01); *B01J 37/0228* (2013.01); *B01J 37/0244* (2013.01); *C02F 1/30* (2013.01); *C02F 1/725* (2013.01); *C09K 11/7773* (2013.01); *B01J 2235/00* (2024.01); *B01J 2235/15* (2024.01); *B01J 2235/30* (2024.01); *C02F 2101/308* (2013.01); *C02F 2101/345* (2013.01); *C02F 2305/08* (2013.01); *C02F 2305/10* (2013.01)

(56) References Cited

OTHER PUBLICATIONS

Bin-Bin Ding et al., "Unique Upconversion Core-Shell Nanoparticles with Tunable Fluorescence Synthesized by a Sequential Growth Process", www.MaterialsViews.com, Advanced Materials Interfaces 2016, 3, 1500649, DOI:10.1002/admi.201500649, 6 pages.

Zhendong Wang et al., "Upconversion Tm3+:CeO2/palygorskite as direct Z-scheme heterostructure for photocatalytic degradation of bisphenol A", Journal of Photochemistry & Photobiology A: Chemistry 372 (2019) 42-48, www.elsevier.com/locate/jphotochem, https://doi.org/10.1016/j.jphotochem.2018.11.042, 7 pages.

Hui-Qin Wen et al., "Sequential Growth of NaYF4:Yb/Er@NaGdF4 Nanodumbbells for Dual-Modality Fluorescence and Magnetic Resonance Imaging", ACS Applied Materials & Interfaces, www.acsami.org, DOI: 10.1021/acsami.6b16842, 7 pages.

Murad M. A. Abualrejal et al., "Rational Synthesis of three-dimensional core-double shell upconversion nanodendrites with ultrabright luminescence for bioimaging application", Chemical Science 2019, 10, 7591, Royal Society of Chemistry, DOI: 10.1039/c9sc01586h, 9 pages.

Hongda Li et al., "Engineering of Gd/Er/Lu-triple-doped Bi2MoO6 to synergistically boost the photocatalytic performance in three different aspects: Oxidizability, light absorption and charge separation", Applied Surface Science 463 (2019) 556-565, www.elsevier.com/locate/apsusc, https://doi.org/10.1016/j.apsusc.2018.08.254, 10 pages.

Yongbao Liu et al., "A novel synergy of Er3+/Fe3+ co-doped porous Bi5O7I microspheres with enhanced photocatalytic activity under visible-light irradiation", Applied Catalysis B: Environment 205 (2017) 421-432, www.elsevier.com/locate/apcatb, http://dx.doi.org/10.1016/j.apcatb.2016.12.061, 12 pages.

Guangzhi Xia et al., "Photocatalytic Performances of Pr3+ Doped Y2SiO5/TiO2 Film for Nitrobenzene Degradation under Visible-light Irradiation", Journal of the Chinese Ceramic Society, Jan. 2016, vol. 44, No. 1, DOI: 10.14062/j.issn.0454-5648.2016.01.13, 8 pages.

Vignesh C. Bhethanabotla et al., "Assessment of mechanisms for enhanced performance of Yb/Er/titania photocatalysts for organic degradation: Role of rare earch elements in the titania phase", Applied Catalysis B: Environmental 202 (2017) 156-164, www.elsevier.com/locate/apcatb, http://dx.doi.org/10.1016/j.apcatb.2016.09.008, 9 pages.

S. Obregon et al., "Evidence of upconversion luminescence contribution to the improved photoactivity of erbium doped TiO2 sytems", ChemComm, 2012, 48, 7865-7867, www.rsc.org/chemcomm, DOI: 10.1039/c2cc.33391k, 3 pages.

Dianxun Hou et al., "Preparation of carbon-sensitized and Fe—Er codoped TiO2 with response surface methodology for bishphenol A photocatalytic degradation under visible-light irradiation", Applied Catalysis B: Environmental 126 (2012) 121-133, www.elsevier.com/locate/apcatb, http://dx.doi.org/10.1016/j.apcatb.2012.07.012, 13 pages.

Naiying Fan et al., "Enhanced photocatalytic activity and upconversion luminescence of flowerlike hierarchical Bi2MoO6 microspheres by Er3+ doping", Journal Materials Research, vol. 27, No. 11, Jun. 14, 2012, DOI: 10.1557/jmr.2012.89, 5 pages.

Wanjun Wang et al., "A NIR-driven photocatalyst based on a-NaYF4:Yb, Tm@TiO2 core-shell structure supported on reduced graphene oxide", Applied Catalysis B: Environmental 182 (2016) 184-192, www.elsevier.com/locate/apcatb, http://dx.doi.org/10.1016/j.apcatb.2015.09.022, 9 pages.

Wei Wang et al., "A study on upconversion UV-vis-NIR responsive photocatalytic activity and mechanisms of hexagonal phase NaYF4:Yb3+, Tm3+@TiO2 core-shell structured photocatalyst", Applied Catalysis B: Environmental 144 (2014) 379-385, www.elsevier.com/locate/apcatb, http://dx.doi.org/10.1016/j.apcatb.2013.07.035, 7 pages.

Weilong Shi et al., "Highly efficient visible/near-infrared light photocatalytic degradation of antibiotic wastewater over 3D yolk-shell ZnFe2O4 supported 0D carbon dots with up-conversion property", Chinese Journal of Chemical Engineering 49 (2022) 213-223, www.elsevier.com/locate/CJChE, https://doi.org/10.1016/j.cjche.2021.11.026, 11 pages.

Min-Zhong Huang et al., "Toward NIR driven photocatalyst: Fabrication, characterization, and photocatalytic activity of B—NaYF4:Yb3+, Tm3+/g-C3N4 nanocomposite", Journal of Colloid and Interface Science 460 (2015) 264-272, www.elsevier.com/locate/jcis, http://dx.doi.org/10.1016/j.jcis.2015/08.063, 9 pages.

Zhangxu Chen et al., "Magnetic infrared responseive photocatalyst: fabrication, characterization, and photocatalytic performance of B—NaYF4:Yb3+, Tm3+/TiO2/Fe3O4@SiO2 composite", Res Chem Intermed (2018) 44:6369-6385, https://doi.org/10.1007/s11164-018-3495-9, 17 pages.

Wei Wang et al., "Different Upconversion Properties of B—NaYF4:yb3+, Tm3+/Er3+ in Affecting the Near-Infrared-Driven Photocatalytic Activity of High-Reactive TiO2", ACS Applied Materials & Interfaces 2014, 6, 340-348, www.acsami.org, 2013 American Chemical Society, dx.doi.org/10.1021/am404389g, 9 pages.

Zhijie Zhang et al., "Inducing photocatalysis by visible light beyond the absorption edge: Effect of upconversion agent on the photocatalytic activity of Bi2WO6", Applied Catalysis B: Environmental 101 (2010) 68-73, www.elsevier.com/locate/apcatb, doi: 10.1016/j.apcatb.2010.09.008, 6 pages.

Joanna Reszczynska et al., "Visible light activity of rare earth metal doped (Er3+, Yb3+ or Er3+/Yb3+) titania photocatalysts", Applied Catalysis B: Environmental 163 (2015) 40-49, www.elsevier.com/locate/apcatb, http://dx.doi.org/10.1016/j.apcatb.2014.07.010, 10 pages.

Joanna Reszczynska et al., "Photocatalytic activity and luminescence properties of RE3+-TiO2 nanocrystals prepared by sol-gel and hydrothermal methods", Applied Catalysis B: Environmental 181 (2016) 825-837, www.elsevier.com/locate/apcatb, http://dx.doi.org/10.1016/j.apcatb.2015.09.001, 13 pages.

Zhijie Zhang et al., "Enhanced photocatalytic activity of Bi2WO6 doped with upconversion luminescence agent", Catalysis Communications 13 (2011) 31-34, www.elsevier.com/locate/catcom, doi:10.1016/j.catcom.2011.06.010, 4 pages.

Tengfei Zhou et al., "Er3+ doped bismuth molybdate nanosheets with exposed {0 1 0} facets and enhanced photocatalytic performance", Applied Catalysis B: Environmental 110 (2011) 221-230, www.elsevier.com/locate/apcatb, doi: 10.1016/j.apcatb.2011.09.004, 10 pages.

S. Obregon et al., "High-performance Er3+-TiO2 system: Dual up-conversion and electronic role of the lanthanide", Journal of Catalysis 299 (2013) 298-306, www.elsevier.com/locate/jcat, http://dx.doi.org/10.1016/j.jcat.2012.12.021, 9 pages.

(56) References Cited

OTHER PUBLICATIONS

Pawel Mazierski et al., "Enhanced photocatalytic properties of lanthanide-TiO2 nanotubes: An experimental and theoretical study", Applied Catalysis B: Environmental 205 (2017) 376-385, www.elsevier.com/locate/apcatb, http://dx.doi.org/10.1016/j.apcatb.2016.12.044, 10 pages.

Mingliang Yu et al., "Intimate coupling of photocatalysis and biodegradation for wastewater treatment: Mechanisms, recent advances and environmental applications", Water Research 175 (2020) 115673, www.elsevier.com/locate/watres, https://doi.org/10.1016/j.watres.2020.115673, 13 pages.

Dandon Zhou et al., "Intimate Coupling of Photocatalysis and Biodegradation for Degrading Phenol Using Different Light Types: Visible Light vs. UV Light", Environmental Science and Technology 2015, 49, 7776-7783, pubs.acs.org/est, DOI:10.1021/acs.est.5b00989, and Supporting Information, 32 pages.

Mengchuan Xu et al., "Preparation and performance of Pr3+:Y2Sio5/TiO2 composites deposited on activated carbon fiber", CIESC Journal, vol. 67, No. 11, Nov. 2016, DOI: 10.11949/j.issn.0438-1157.20160716, 7 pages.

Nai-Ying Fan et al., "Pure Green Upconversion Luminescence and Enhanced Photocatalytic Activity of Flower-like Heirarchical Bi2WO6:Er3+ Microspheres", Chinese Journal of Luminescence, vol. 33, No. 3, Mar. 2012, Article ID: 1000-7032(2012)03-0263-06, DOI: 10.3788/fgxb20123303.0263, 6 pages.

* cited by examiner

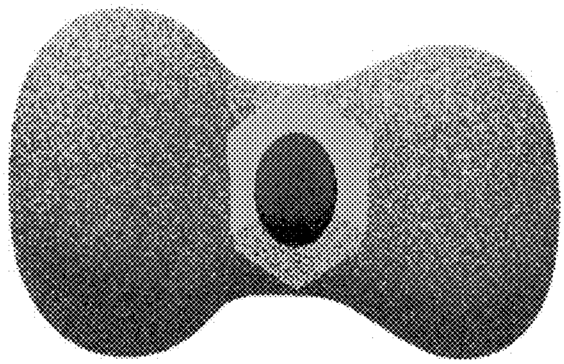
FIG. 1A
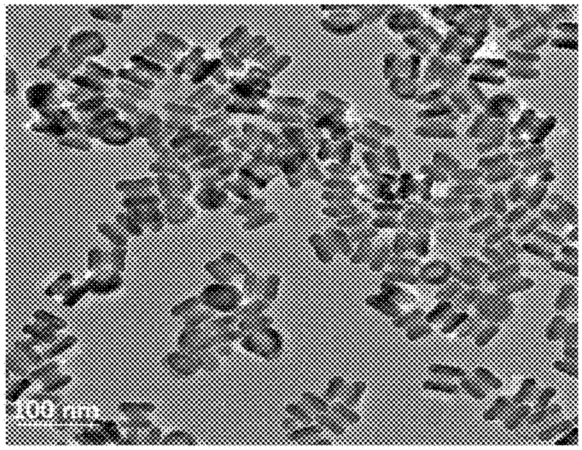
FIG. 1B
| Elements | Ca (ppm) | Er (ppm) | Y (ppm) | Yb (ppm) | F (ppm) | Nd (ppm) |
|---|---|---|---|---|---|---|
| Values | 0.8 | 2.0 | 2.0 | 4.45 | 0.7 | 90.05 |
FIG. 1C

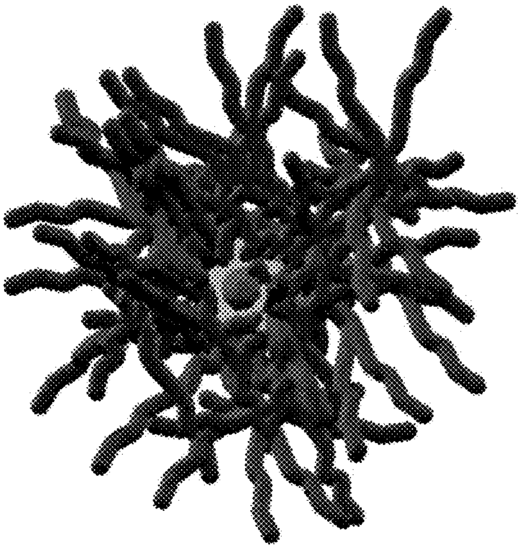
FIG. 2A
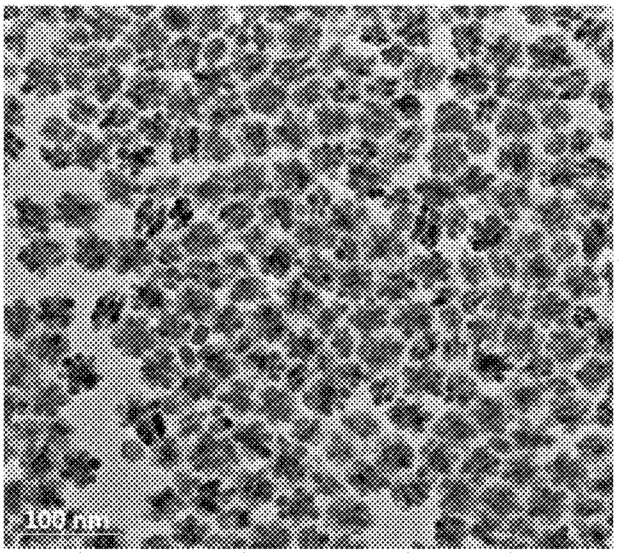
FIG. 2B
| | Elements | Ca (ppm) | Er (ppm) | Y (ppm) | Yb (ppm) | F (ppm) | Nd (ppm) |
|---|---|---|---|---|---|---|---|
| | Values | 2.1 | 5.0 | 5.0 | 7.1 | 0.7 | 80.1 |
FIG. 2C

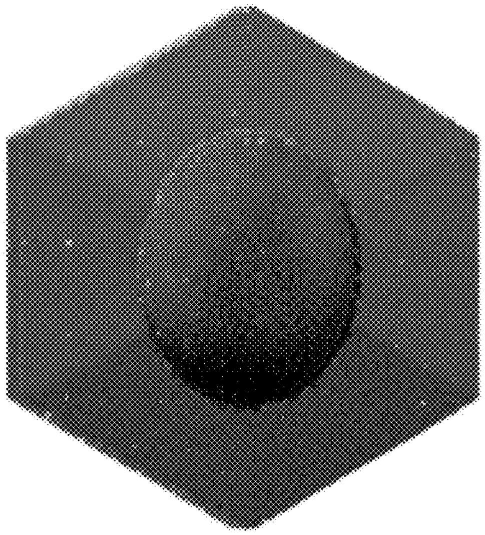
FIG. 3A
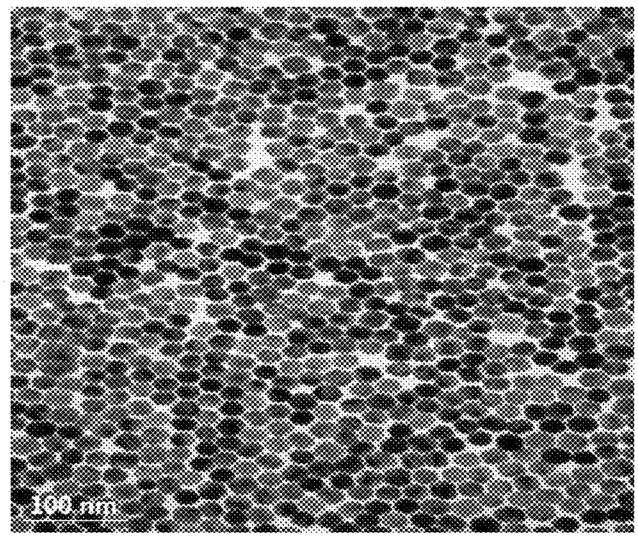
FIG. 3B
| Element | Ca | Y | Yb | Er |
|---|---|---|---|---|
| Composition (ppm) | 5.8 | 31.1 | 31.9 | 31.2 |
FIG. 3C

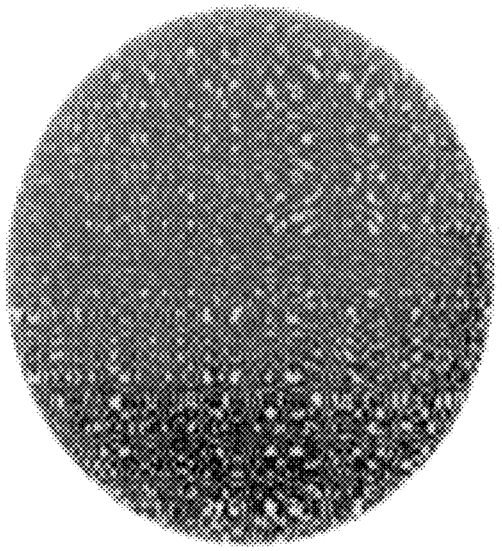
FIG. 4A
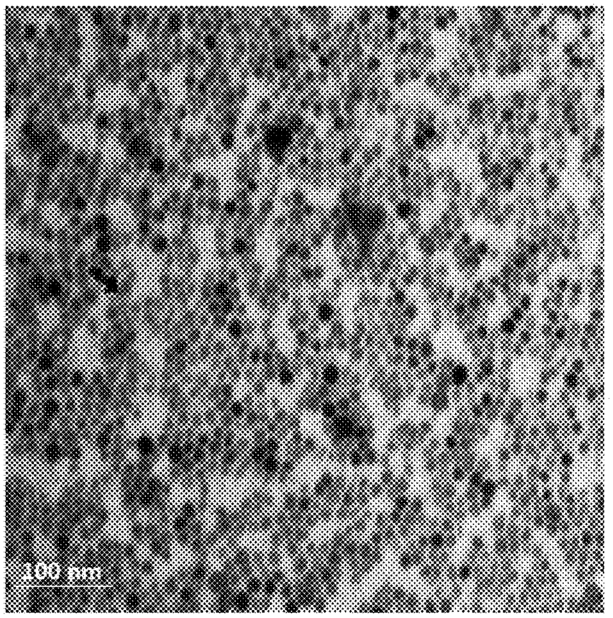
FIG. 4B
| | Element | Ca | Y | Yb | Er |
|---|---|---|---|---|---|
| | Composition (ppm) | 1.9 | 32.6 | 32.9 | 32.6 |
FIG. 4C

MULTIDIMENSIONAL MULTILAYERED UPCONVERSION NANOARCHITECTONICS WITH TUNEABLE Nd CONTENT FOR EFFICIENT PHOTOCATALYTIC PHENOLIC DEGRADATION UNDER AMBIENT CONDITIONS

CROSS-REFERENCE TO RELATED APPLICATION

This application is a U.S. non-provisional application that claims the benefit of U.S. Provisional Application No. 63/346,270 (filed May 26, 2022), which is hereby incorporated by reference for all purposes.

TECHNICAL FIELD

The present invention is directed to multidimensional upconversion nanomaterial compositions and methods that are useful in the photolytic degradation of phenolic pollutants, such as phenol.

BACKGROUND ART

Almost all industries use and release phenol, which is highly toxic to aquatic life, the environment, and humans. Due to the physiochemical stability of phenol to photo-, electro-, photoelectro-, and bio-degradation, its degradation under ambient conditions is a daunting challenge and takes several hours even in the presence of high amounts of catalysts. Likewise, the degradation of phenol using photocatalysts is also a sluggish process, requiring several hours to reach 80% completion, because of the inferior visible light absorption (~5%) and low light utilization efficiency.

Thus, there is a need for more effective methods for the removal of phenol and similar pollutants under ambient conditions, which could provide improved methods for removal of these contaminants.

The rational design of upconversion nanostructures has much great attention in biomedical applications ranged from bioimaging and sensing to therapy. The controlled fabrication of multidimensional, multilayered upconversion nanoparticles has been reported (albeit rarely), but for biomedical applications. See B. Xu et al., *Journal of Materials Chemistry B,* 2016, 4, 2776-2784; B. B. Ding et al., *Advanced Materials Interfaces,* 2016, 3, 1500649; H.-Q. Wen et al., *ACS applied materials & interfaces,* 2017, 9, 9226-9232; and M. M. Abualrej al et al., *Chemical science,* 2019, 10, 7591.

A challenge in the fabrication of a multilayered upconversion nanomaterial is its multidimensional nanostructure, which has a tendency to grow in a zero-dimensional shape to reduce total surface energy. The reported upconversion materials may also contain only one sensitizer with low content, which may make them less suitable for use.

Thus, there is a need for more efficient production of multilayered upconversion compositions.

BRIEF SUMMARY

Provided herein are novel multilayered upconversion nanomaterial compositions and methods.

In certain embodiments, the multidimensional multilayered upconversion nanoarchitectonics has unique structural and compositional merits for photocatalytic degradation of a phenolic pollutant (e.g., phenol) within a few min (~30±5 min) at room temperature, a rate never reported elsewhere for any photocatalysts. Distinct from traditional photocatalysts (e.g., transition metal oxides, quantum dots, and their hydrides), the present invention's upconversion nanoarchitectonics can maximize the visible light absorption with low energy to higher energy radiation along with great near-infrared (NIR) light adsorption resonant non-radiative transfer. The obtained multilayered nanoarchitectonics involve multiple sanitizers with tunable contents and multidimensional, anisotropic, and outstanding surface merits (branches, cavities, corners) that provide massive adsorption sites for light absorption.

In certain embodiments, the present invention is directed to a multi-layered upconversion nanoparticle including:

an active core, wherein the active core includes Er (e.g., $Er^{3-}$);

an intermediate layer, wherein the intermediate layer includes Yb (e.g., $Yb^{3+}$); and an exterior layer; wherein the intermediate layer is between the active core and the exterior layer, and wherein the exterior layer includes Nd (e.g., $Nd^{3+}$).

In certain embodiments, the present invention is directed to a method for degrading a phenolic pollutant (e.g., phenol) in a medium (e.g., water), the method including exposing a mixture of the medium and the multi-layered upconversion nanoparticle as otherwise disclosed herein to light.

In certain embodiments, the present invention is directed to a method for preparing the multi-layered upconversion nanoparticle as otherwise disclosed herein (e.g., a seed-mediated growth method coupled with a solvothermal method), the method including using an active core particle as a seed for growth of the intermediate layer to produce a core-shell particle; and using the core-shell particle as a seed for growth of the outer layer to produce the multi-layered upconversion nanoparticle.

Other embodiments and aspects of the invention as described herein and are considered a part of the claimed invention.

BRIEF DESCRIPTION OF THE DRAWINGS

FIGS. 1A-1C show the composition of multidirectional, multilayered $NaYF_4$:Yb,Er,Ca@$NaYF_4$:Yb,Ca@$NaNdF_4$:Yb sandglass-like nanoarchitectonics, with (a) a 3D model of an exemplary sandglass-like structure, (b) a transmission electron microscopy (TEM) image, and (c) inductively coupled plasma-optical emission spectrometry (ICP-OES) results.

FIGS. 2A-2C show the composition of multidirectional, multilayered $NaYF_4$:Yb,Er,Ca@$NaYF_4$:Yb,Ca@$NaNdF_4$:Yb star-like nanoarchitectonics, with (a) a 3D model of an exemplary star-like structure, (b) a TEM image, and (c) ICP-OES results.

FIGS. 3A-3C show the composition of core-shell hexagonal $NaYF_4$:Yb,Er,Ca@$NaYF_4$:Yb nanoarchitectonics, with (a) a 3D model of an exemplary core-shell hexagonal structure, (b) a TEM image, and (c) ICP-OES results.

FIGS. 4A-4C show the composition of semispherical $NaYF_4$:Yb,Er,Ca nanoarchitectonics, with (a) a 3D model of an exemplary semispherical structure, (b) a TEM image, and (c) ICP-OES results.

Figure 5A:
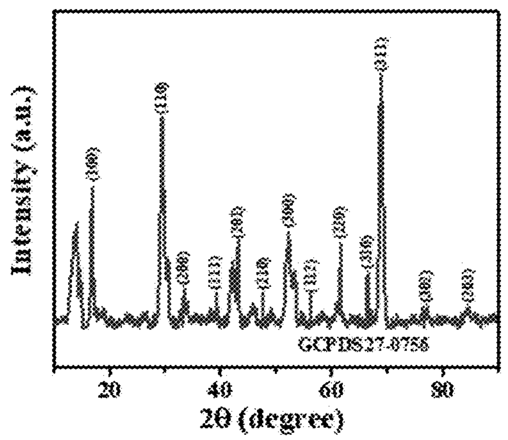
FIGS. 5A-5D show additional experimental data for the as-synthesized sandglass-like nanoarchitectonics, with (a) an X-ray diffraction (XRD) spectrum of the sandglass-like structure, (b) X-ray photoelectron spectroscopy (XPS) survey results, (c) upconversion luminescence (UCL) results under 808 nm excitation with a power density of 1.5 W $cm^{-2}$, and (d) ultraviolet (UV) absorbance of the as-synthesized sandglass-like nanoarchitectonics.

Illustrative embodiments of the present invention are described in detail below with reference to the attached drawing figures, which are incorporated by reference herein.

DETAILED DESCRIPTION

Provided herein are compositions and methods directed to the rational fabrication of wide ranges of multi- and multidimensional upconversion nanoarchitectonics with controllable shapes and compositions based on epitaxial growth.

The as-synthesized upconversion nanoarchictonics possess various unique physicochemical merits including, massive active sites, strong energy absorption, effective energy transfer, intense nonblinking upconversion luminescence, and without energy back transfer or quenching, which are highly required for various catalytic applications. The fabrication approach is facile, one-step, template-free, productive, and versatile for the preparation of freestanding or supported upconversion nanoarchitectonics. The obtained multilayered nanoarchictonics involve multiple sanitizers with tunable contents and multidimensional, anisotropic, and outstanding surface merits (e.g., branches, cavities, or corners) that provide massive adsorption sites for the light absorption. The newly designed upconversion nanoarchitectonics allowed the efficient photocatalytic degradation of phenol (e.g., within only 35 min at room temperature).

Definitions

When referring to the compounds, composites, compositions, and methods provided herein, the following terms and phrases have the following meanings unless indicated otherwise. Unless defined otherwise, all technical and scientific terms and phrases used herein have the same meaning as is commonly understood by one of ordinary skill in the art. If there is a plurality of definitions for a term or phrase provided herein, these Definitions prevail unless stated otherwise.

As used herein, “a,” “an,” or “the” can include not only includes aspects and embodiments with one member, but also aspects and embodiments with more than one member. For example, an aspect comprising “a component selected from the group consisting of X, Y, and Z” may present embodiments comprising X, Y, Z, X in combination with Y, Y in combination with Z, X in combination with Z, or all three (X, Y, and Z) in combination.

As used herein, “nanoscale” refers to particles having a size of less than 100 nm.

As used herein, “independently” refers to the relationship among multiple instances of the same variable when selected from the same set of possibilities (e.g., a Markush group). For example, if the variable X is selected independently from the group consisting of a, b, and c, each instance of X in a structure can be the same as (e.g., all “a”) or be different from any other instance of X (e.g., for three “X,” one “b” and two “a” or any other combination of a, b, and c).

Typically, for at least some embodiments of a group as disclosed herein (e.g., “A, B, or C”; “the member selected from the group consisting of A, B, and C”), members of the group are (1) independently selected from the alternatives and (2) groups do not exclude the possibility of embodiments comprising combinations of the individual group members.

As used herein, “or” is not exclusive (i.e., “or” may be equivalent to “and/or”). For example, an aspect comprising “A, B, or C” may present embodiments with A, B, C, A in combination with B, B in combination with C, A in combination with C, or all three (A, B, and C) in combination.

As used herein, “zero-dimensional” nanomaterials (e.g., nanoparticles) refer to nanomaterials where all the dimensions of the nanomaterials are measured within the nanoscale. For example, in certain embodiments, no dimension of the nanomaterial is larger than 100 nm. In certain embodiments, zero-dimensional nanomaterials are nanoparticles.

As used herein, "one-dimensional" nanomaterials (e.g., nanosheets) refer to nanomaterials where at least one dimension is outside of the nanoscale. For example, in certain embodiments, when one dimension of the nanomaterial is larger than 100 nm. In certain embodiments, one-dimensional nanomaterials are nanosheets.

As used herein, "two-dimensional" nanomaterials (e.g., nanosheets) refer to nanomaterials where at least two dimensions are outside the nanoscale. For example, in certain embodiments, two dimensions of the nanomaterial are larger than 100 nm. In certain embodiments, two-dimensional nanomaterials are plate-like shapes. In certain embodiments, two-dimensional nanomaterials include, without limitation, nanofilms, nanolayers, and nanocoatings.

As used herein, "three-dimensional" materials refer to materials where each dimension is outside the nanoscale.

As used herein, "multidimensional" materials refer to materials where different layers or domains may have different dimensions. For example, a multilayered multidimensional material of the instant invention include a zero-dimensional core and a one- or two-dimensional outer layer.

As used herein, "w/w" refers to a percentage by weight. Unless specified otherwise, percentages disclosed herein are percentage by weight—that is, [(weight of a component)/(total weight of all components)]×100.

Compositions

In certain embodiments, this invention is directed to the rational design of novel kind of upconversion nanoarchitectonics materials with tunable Nd content.

This invention also reports a new use for upconversion as photocatalysis along with a substantial improvement of the photocatalytic properties of commercial $TiO_2$ catalyst.

The obtained upconversion nanoarchitectonics were utilized for photocatalytic phenol degradation within a few minutes under ambient conditions. The invention includes the fabrication of multilayered multidimensional upconversion star-like composed of an active interior ($NaYF_4$:Yb,Er,Ca) in a spherical shape, second layer ($NaYF_4$:Yb,Ca) in a hexagonal shape and exterior layer ($NaNdF_4$:Yb,Ca) in spatial dendritic shape with Nd of (80% w/w).

The invention comprises the synthesis of multilayered, multidimensional upconversion sandglass nanoarchitectonics composed of an active interior ($NaYF_4$:Yb,Er,Ca) in a semispherical shape, an intermediate layer ($NaYF_4$:Yb,Ca) in hexagonal shape, and an outer layer ($NaNdF_4$:Yb,Ca) in sandglass shape with Nd of (10-80% w/w).

The fabrication process is based on seed-mediated, and the epitaxial growth is under solvothermal conditions. The synthetic method is facile, one-step, template-free, and versatile for the synthesis of upconversion nanoarchitectonics with controllable shapes and composition in a high yield with high feasibility for large-scale applications. Mainly, initial core nanoparticles is prepared by the solvothermal approach that is subsequently used as seeds for supporting the epitaxial growth of the second layer to form core-shell nanostructure. That is also used as seeds for the epitaxial growth of the third layer to form core@multiple shell nanoarchitectonics.

The method allows the high-mass production of free-standing or supported nanoarchitectonics with different morphologies and compositions.

The obtained upconversion nanoarchitectonics comprise the unique physiochemical properties of multidimensional shape (i.e., high surface area to volume ratio, massive active sites, non-autofluorescence, high chemical stability, large light-penetration depth, long lifetime, and strong energy absorption with inferior energy back transfer). This is in addition to impressive properties of multilayered shape (i.e., effective energy transfer, strong, nonblinking upconversion luminescence (UCL), long-distance between the inner cores and exterior shell from the shell, quick energy migration, and without cross-relaxation and quenching).

The $Nd^{3+}$ in the outer shell act as a sensitizer and enhance the NIR photons absorption. Meanwhile, $Yb^{3+}$ in the intermediate layer act as a bridge for energy transfer from $Nd^{3+}$ to $Er^{3+}$ activator in the inner core besides avoiding energy back-transfer and quenching from $Er^{3+}$ and $Nd^{3+}$, respectively.

The as-developed upconversion nanoarchitectonics allowed the significant enhancement in the photocatalytic phenol degradation with less than 35 min that is highly beneficent compared to traditional photocatalysts that need several hours.

In certain aspects and embodiments, provided herein is a multi-layered upconversion nanoparticle including:

- an active core, wherein the active core includes Er (e.g., $Er^{3+}$);
- an intermediate layer, wherein the intermediate layer includes Yb (e.g., $Yb^{3+}$); and
- an exterior layer; wherein the intermediate layer is between the active core and the exterior layer, and wherein the exterior layer includes Nd (e.g., $Nd^{3+}$).

In certain embodiments, the active core is spherical or semispherical. In certain embodiments, the active core is spherical. In certain embodiments, the active core is semispherical.

In certain embodiments, the active core includes $NaYF_4$:Yb,Er,Ca. In certain embodiments, the active core is $NaYF_4$:Yb,Er,Ca.

In certain embodiments, the intermediate layer is hexagonal or octagonal. In certain embodiments, the intermediate layer is hexagonal. In certain embodiments, the intermediate layer is octagonal.

In certain embodiments, the intermediate layer includes $NaYF_4$:Yb,Ca. In certain embodiments, the intermediate layer is $NaYF_4$:Yb,Ca.

In certain embodiments, the outer layer is sandglass-like or star-like. In certain embodiments, the outer layer is sandglass-like. In certain embodiments, the outer layer is star-like.

In certain embodiments, the outer layer includes $NaNdF_4$:Yb. In certain embodiments, the outer layer is $NaNdF_4$:Yb.

In certain embodiments, the outer layer includes from about 10% to 80% w/w Nd (e.g. about 10, 15, 20, 25, 30, 35, 40, 45, 50, 55, 60, 65, 70, 75, or 80%). In certain embodiments, the outer layer includes at least about 20% w/w Nd (e.g., at least about 20, 21, 22, 23, 24, 25, 26, 27, 28, 29, 30, 31, 32, 33, 34, 35, 36, 37, 38, or 39%). In certain embodiments, the outer layer includes at least about 30% w/w Nd. In certain embodiments, the outer layer includes at least about 40% w/w Nd (e.g., at least about 40, 41, 42, 43, 44, 45, 46, 47, 48, 49, 50, 51, 52, 53, 54, 55, 56, 57, 58, or 59%). In certain embodiments, the outer layer includes at least about 50% w/w Nd. In certain embodiments, the outer layer includes at least about 60% w/w Nd (e.g., at least about 60, 61, 62, 63, 64, 65, 66, 67, 68, 69, 70, 71, 72, 73, 74, 75, 76, 77, 78, or 79%). In certain embodiments, the outer layer includes at least about 70% w/w Nd.

In certain aspects and embodiments, the active core is spherical; the intermediate layer is hexagonal; and the outer layer is sandglass-like. In certain aspects and embodiments, the active core is semispherical; the intermediate layer is octagonal; and the outer layer is star-like.

In certain aspects and embodiments, provided herein are compositions including hexagonal core-shells nanoparticles. In certain embodiments, the nanoparticles include $NaYF_4$: Yb, Er, Ca@$NaYF_4$: Yb, Ca UCNPs core-shells nanoparticles.

In certain embodiments, the compositions include multidimensional multilayered star-like nanoarchitectonics. In certain embodiments, the composition include multidimensional multilayered sandglass nanoarchitectonics.

Further disclosure is provided containing all the technical descriptions of the invention, including the obtained preparation, characterization, and results.

Methods for Preparing Upconversion

In certain aspects and embodiments, provided herein are methods for preparing the multi-layered upconversion composition as otherwise presented herein (e.g., a seed-mediated growth method coupled with a solvothermal method), the method including using an active core particle as a seed for growth of the intermediate layer to produce a core-shell particle; and using the core-shell particle as a seed for growth of the outer layer to produce the multi-layered upconversion nanoparticle.

In certain embodiments, provided herein are methods of preparing hexagonal core-shell nanoparticles, including:

synthesizing hexagonal core-shell nanoparticles as otherwise disclosed herein.

In certain embodiments, provided herein are methods of preparing multidimensional multilayered nanoparticles, including:

synthesizing multidimensional multilayered nanoparticles from hexagonal core-shell nanoparticles as otherwise disclosed herein.

In certain embodiments, the intermediate layer is hexagonal or octagonal. In certain embodiments, the intermediate layer is hexagonal. In certain embodiments, the intermediate layer is octagonal.

In certain embodiments, the outer layer is sandglass-like or star-like In certain embodiments, the intermediate layer is sandglass-like. In certain embodiments, the intermediate layer is star-like.

Methods of Degrading a Phenolic Pollutant

In certain aspects, provided herein are methods of treating a medium (e.g., water) comprising a phenolic pollutant (e.g., phenol) using any of the compositions described herein. Certain embodiments of any of the composites described elsewhere herein are contemplated to provide for treating water.

In certain aspects, provided herein is a method for degrading a phenolic pollutant (e.g., phenol) in a medium, the method including exposing a mixture of the medium and the multi-layered upconversion nanoparticle as otherwise taught herein to light.

In certain embodiments, the light is visible light. In certain embodiments, the light is near infrared light (NIR).

In certain aspects and embodiments, provided herein is a method of photolytically degrading a phenolic pollutant (e.g., phenol), including:

treating a phenolic pollutant (e.g., phenol) with light in the presence of a composition as otherwise disclosed herein (e.g., a sandglass-like or a star-like upconversion nanoparticle).

In certain embodiments, the method further includes exposing the mixture to near-infrared radiation.

In certain embodiments, the degradation is >70% complete (e.g., at least 70, 75, 80, or 90%). In certain embodiments, the degradation is >90% complete (e.g., at least 90, 93, 95, 97, 98, or 99%).

In certain embodiments, the use of a composition as otherwise taught herein enhanced the photocatalytic performance of phenolic pollutant (e.g., phenol) degradation in water at room temperature under visible light by more than 2 times compared to $TiO_2$ alone in the presence and in the absence of $H_2O_2$.

In certain embodiments, the methods are directed to treating and purifying a medium using any of the aspects and embodiments of compositions described herein. Certain embodiments of any of the compositions described elsewhere herein are contemplated to provide for the removal, or an improved removal, of phenolic pollutants from the treated medium (i.e., one or more phases or mixtures of phases, such as a contaminated liquid or gas, the phase or phases comprising one or more impurity compounds or pollutants).

In certain embodiments, the phenolic pollutants are selected from the group consisting of phenol, p-chlorophenol, and p-nitrophenol. In certain embodiments, the phenolic pollutant is phenol. In certain embodiments, the phenolic pollutant isp-chlorophenol. In certain embodiments, the phenolic pollutant is p-nitrophenol.

In certain embodiments, the phenolic pollutant is a dye. In certain embodiments, a dye is an colored, aromatic compound that absorbs some wavelengths of light (e.g., quinone-imine dyes).

In certain embodiments, the medium is selected from the group consisting of water (e.g., wastewater), an oil medium, or a gaseous medium. In certain embodiments, the medium is wastewater. In certain embodiments, the wastewater comprises industrial wastewater or domestic wastewater. In certain embodiments, the phenolic pollutants are in water (e.g., process water or produced water comprising phenolic pollutants). In certain embodiments, the medium is an oil or a liquid comprising an oil. In certain embodiments, the medium is gaseous.

As would be appreciated by a person of skill in the art, phenol pollutants can be dissolved in wastewater. Pollutants can also be dissolved in oil(s). Moreover, phenol pollutants can be within a gaseous medium, for example, as volatilized pollutant species. In each of the medium described herein, the composites described herein can be used to remove phenol pollutants from one or more of each medium. In certain embodiments, the wastewater includes industrial wastewater. In certain embodiments, the wastewater includes domestic wastewater.

In certain embodiments, the inventive composition is used on an industrial scale. In certain embodiments, the inventive composition is used on domestic scale (i.e., a smaller scale that is more appropriate for use in a house or multi-family residence, such as an apartment).

In certain embodiments, the degrading pollutants in the medium (e.g., wastewater) occurs at room temperature.

In certain embodiments, the degrading pollutants in the medium (e.g., wastewater) occurs at atmospheric pressure.

In certain embodiments, the method removes the phenolic pollutants in less than 120 minutes (e.g., 120, 110, 100, 90, 80, 70, 60, 50, 40, or 30 min). In certain embodiments, the adsorbing pollutants from the wastewater removes the phenolic pollutants in less than 40 minutes (e.g., 40, 35, 30, or 25 min).

Examples

Provided herein are exemplary multilayered multidimensional nanoparticular compositions and methods for photolytic degradation of phenolic pollutants (e.g., phenol). Also provided herein are exemplary methods of preparing the compositions described herein.

Certain embodiments of the invention are illustrated by the following non—limiting examples. As used herein, the symbols and conventions used in these processes, schemes, and examples, regardless of whether a particular abbreviation is specifically defined, are consistent with those used in the contemporary scientific literature, e.g., the Journal of the American Chemical Society or Applied Surface Science. Specifically, but without limitation, the following abbreviations may be used in the Examples, and throughout the specification:

| Abbreviation | Term or Phrase |
|---|---|
| Aq. | aqueous |
| ESI | electrospray ionization |
| hr, h, or hrs | hours |
| LC | liquid chromatography |
| MS | mass spectrometry |
| MW | molecular weight |
| ppm | parts per million |
| rt | room temperature |
| UV | ultraviolet |

Analysis Methods

The transmission electron microscope (TEM) images were recorded using (TEM, TecnaiG220, FEI, Hillsboro, OR, USA), equipped with an energy dispersive spectrometer (EDS), High-angle annular dark-field scanning transmission electron microscopy (HAADF-STEM), and high-resolution TEM (HRTEM). The X-ray photoelectron spectroscopy (XPS) was analyzed on a VGESCALAB MKII (VG XPS Scientific Ltd., UK) equipped with a monochromatic Al Kα radiation source (1486.6 eV) under a UHV environment (ca. $5\times10^{-9}$ Torr). The X-ray diffraction pattern (XRD) was recorded on an X-ray diffractometer (D8 ADVANCE diffractometer (Broker Co., Germany). The upconversion luminescence (UCL) spectra were measured with an 808 nm laser from an optical parametric oscillator (OPO) (Continuum Sunlite) as the excitation source. The elemental analysis was performed by an ICAP 6000 ICP-OES system (Thermo Scientific, Waltham, MA, USA).

Example 1: Synthesis of Semispherical Upconversion Nanoparticle Core

All chemicals were used as received without any modifications. Semispherical upconversion $NaYF_4$:Yb,Er,Ca nanoparticles were prepared by mixing $YCl_3$, $YbCl_3$, $Ca(CH_3COOH)_2$, and $ErCl_3$ with final concertation of 0.5 mol $L^{-1}$ in oleic acid (10 mL) and 1-octadecene (10 mL) under stirring under $N_2$, while heating at 150° C., then cooled down to 50° C. before the addition of $CH_3OH$ (5 mL) involving $NH_4F$ (1 mmol) and NaOH (1 mmol) for 20 min, then the solution was degassed while heating at 150° C. The mixture was heated to 300° C. under $N_2$ and kept for 2 h 90 min before being cooled to room temperature followed by centrifugation at 10000 rpm and washing by ethanol for 3 times.

Example 2: Synthesis of Semispherical Upconversion Nanoparticle Core

Two-dimensional $Ti_3C_2T$ nanosheets were typically prepared via mixing 1 g of $Ti_3C_2Al$ Max phase in 10 mL HF (48%) with stirring for 24 h at room temperature to chemically erode the Al metal. The as-obtained $NaYF_4$:Yb,Er,Ca nanoparticles as seeds for the epitaxial growth of hexagonal $NaYF_4$: Yb, Er, Ca@$NaYF_4$: Yb, Ca UCNPs core-shells nanoparticles. This is achieved by mixing $YCl_3$, $YbCl_3$, and $Ca(CH_3COOH)_2$ with final concentration of 0.5 mol $L^{-1}$ in oleic acid (10 mL) and 1-octadecene (10 mL) under stirring under $N_2$, while heating at 150° C., then cooled down to 80° C. before the addition of $NaYF_4$: Yb, Er, Ca core (2 mmol) in cyclohexane (10 mL) then heating to 150° C. without $N_2$. Following that, $CH_3OH$ (15 mL) involving $NH_4F$ (6 mmol) and NaOH 3.5 mmol) for 20 min under stirring at 50° C. under $N_2$ for 30 min. The solution was degassed while heating at 150° C. and then heated to 300° C. under $N_2$ and kept for 2 h 2 h before being cooled to room temperature followed by centrifugation at 10000 rpm and washing by ethanol for 3 times.

Example 3: Synthesis of Multidimensional Multilayered Star-Like Nanoarchitectonics Chitosan hydrogel was initially prepared via dissolving chitosan (4 g) in aq. acetic acid (20% v/v, 100 mL) with mechanical stirring at room temperature. Activated $Ti_3C_2T_x$ nanosheets (1 g in 5 mL DDI-$H_2O$) were added dropwise into the chitosan hydrogel with mechanical stirring and then sonication to remove any air bubbles. The obtained hydrogel was casted onto a glass plate using a doctor blade (draw-down thickness up to 2 mm) for 1 min. The casted membrane was dried in an oven under vacuum at 40° C. for 24 h. The dried membrane was neutralized with NaOH solution and then dried under air 40° C. before any further use or characterization.

Example 4: Synthesis of Multidimensional Multilayered Sandglass-Like Nanoarchitectonics The as-obtained hexagonal $NaYF_4$: Yb, Er, Ca@$NaYF_4$: Yb, Ca UCNPs core-shells nanoparticles were used as seeds for the epitaxial growth of sandglass-like nanoarchitectonics. This is achieved by mixing $YbCl_3$, and $Ca(CH_3COOH)_2$ with final concertation of 0.5 mol $L^{-1}$ in oleic acid (14 mL), and 1-octadecene (32 mL) contains $NdCl_3$, (2.5 mol $L^{-1}$) under stirring under $N_2$, while heating at 150° C. under $N_2$, then cooled down to 80° C. before the addition of $NaYF_4$: Yb,Er,Ca@$NaYF_4$: Yb,Ca UCNPs core-shell (2 mmol) in cyclohexane (20 mL). Following that, the reaction solution was heated to 150° C. without $N_2$, before the addition of $CH_3OH$ (20 mL) involving containing $NH_4F$ (8 mmol) and NaOH (5 mmol) for 20 min under stirring at 50° C. under $N_2$ for 30 min. The solution was degassed while heating at 150° C. and then heated to 300° C. under $N_2$ and kept for 2 h before being cooled to room temperature followed by centrifugation at 10000 rpm and washing by ethanol for 3 times. The concentration of $NdCl_3$ (2.5 mol $L^{-1}$) was changed to (2.0 mol $L^{-1}$), (1.5 mol $L^{-1}$), (1 mol $L^{-1}$), (5 mol $L^{-1}$) to allow the formation of sandglass nanoarchitectonics with Nd of 10, 20, 40, 60, and 80% respectively.

Example 5: Properties of Multilayered Multidimensional Compositions

The properties of the materials developed were investigated further as described below and in the accompanying figures.

FIG. 1A shows the 3D model for the as-developed multidirectional multilayered sandglass-like nanoarchitectonics. FIG. 1B shows the TEM image of sandglass-like nanoarchitectonics $NaYF_4$:Yb,Er,Ca@$NaYF_4$: Yb,Ca@$NaNdF_4$:Yb composed of semi spherical core $NaYF_4$:Yb,Er,Ca coated with hexagonal core-shell $NaYF_4$:Yb,Er,Ca@$NaYF_4$: Yb,Ca coated with outer layer $NaNdF_4$: Yb of sandglass-like spatial. The average diameter of thus obtained sandglass-like nanoarchitectonics is about 60±4 nm (FIG. 1B). FIG. 1C shows the ICP-OES composition of sandglass nanoarchitectonics, which revealed the presence of Na, Y, Nd, Yb, Er, Ca, and F along with the high atomic content of $Nd^{-1}$ (90.05).

FIG. 2A shows the 3D model for the as-developed multidirectional multilayered star-like nanoarchitectonics. FIG. 2B shows the TEM image of sandglass-like nanoarchitectonics $NaYF_4$:Yb,Er,Ca@$NaYF_4$: Yb,Ca@$NaNdF_4$:Yb composed of semispherical core $NaYF_4$:Yb,Er,Ca coated with hexagonal core-shell $NaYF_4$:Yb,Er,Ca@$NaYF_4$: Yb,Ca coated with outer layer $NaNdF_4$: Yb of sandglass-like spatial. The average diameter of thus obtained sandglass-like nanoarchitectonics is about 55±3 nm (FIG. 2B). FIG. 2C shows the ICP-OES composition of sandglass nanoarchitectonics, which revealed the presence of Na, Y, Nd, Yb, Er, Ca, and F along with the high atomic content of $Nd^{-1}$ (80.1).

FIG. 3A shows the 3D model for the as-developed core-shell hexagonal nanoarchitectonics. FIG. 3B shows the TEM image of hexagonal core-shell nanoarchitectonics $NaYF_4$: Yb,Er,Ca@$NaYF_4$:Yb,Ca composed of semispherical core $NaYF_4$:Yb,Er,Ca coated with hexagonal core-shell $NaYF_4$: Yb,Er,Ca. The average diameter of thus obtained sandglass-like nanoarchitectonics is about 28 nm±2 nm (FIG. 3B). FIG. 3C shows the ICP-OES composition of sandglass nanoarchitectonics, which revealed the presence of Y, Yb, and Er along with almost similar atomic (31%) content and with Ca 5.8%.

FIG. 4A shows the 3D model for the as-developed semispherical core nanoarchitectonics. FIG. 4B shows the TEM image of semispherical core nanoarchitectonics composed of $NaYF_4$:Yb,Er,Ca. The average diameter of thus obtained sandglass-like nanoarchitectonics is about 14 nm±1 nm (FIG. 4B). FIG. 4C shows the ICP-OES composition of sandglass nanoarchitectonics, which revealed the presence of Y, Yb, and Er along with almost similar atomic (32.5%) content and with Ca (1.9%).

Figure 5B:
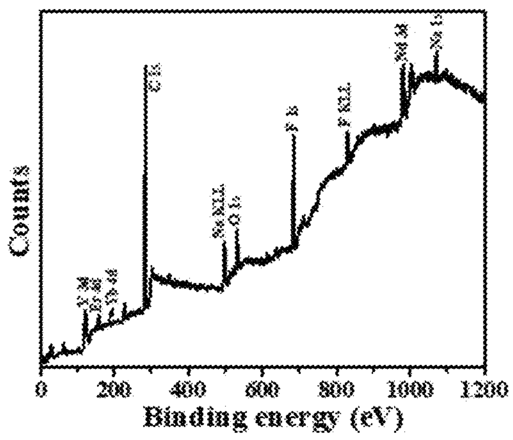
Figure 5C:
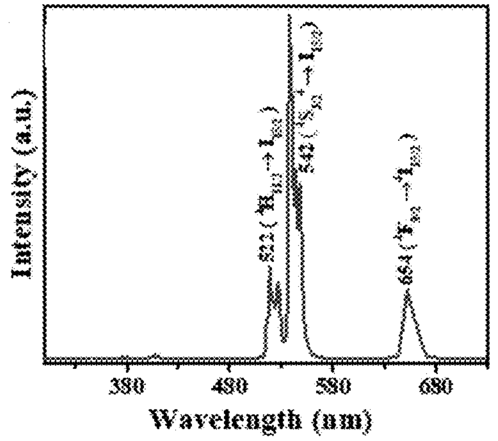
Figure 5D:
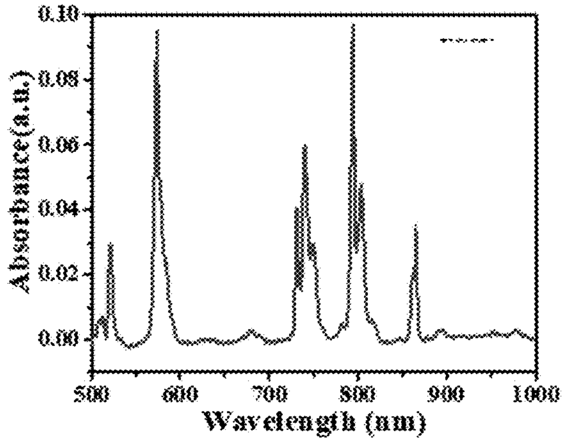

FIG. 5A shows XRD diffraction patterns of the as-synthesized sandglass-like nanoarchitectonics, which showed the main diffraction patterns of $NaNdF_4$ with major peaks assigned to {311}, {110} and {100} planes along with some $NaYF_4$ peaks. FIG. 5B displays the XPS survey of the as-synthesized sandglass-like nanoarchitectonics, which depicted the presence of Y 3d, Er 4d, Yb 4d, C 1s, Na KLL, O 1 s, F 1s, Nd 3, F KLL, and Na 1s spectra indicated the formation of multilayered nanoarchitectonics. FIG. 5C shows upconversion luminescence (UCL) of the as-synthesized sandglass-like nanoarchitectonics, which exhibited multimission peaks assigned to green emission at 522 of ($^4H_{11/2}$→$^4I_{15/2}$) and 542 nm of ($^4S_{3/2}$→$^4I_{15/2}$) along with a red emission peak at 654 nm of ($^4F_{9/2}$→$^4I_{15/2}$) transition. FIG. 5D shows the absorbance of the as-synthesized sandglass-like nanoarchitectonics, which showed the multiple absorption peaks from 500 nm to 900 nm. The maximum absorption was achieved ta 580, 750, 800, and 860 nm.

Figure 6A:
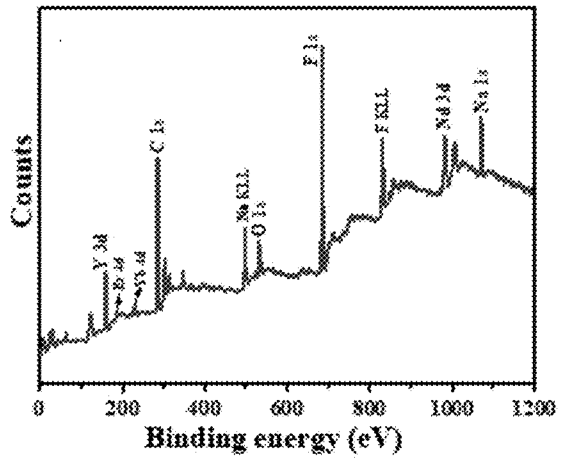
FIGS. 6A-6C show additional experimental data for the as-synthesized star-like nanoarchitectonics, with (a) an XRD spectrum of the exemplary star-like structure, (b) XPS survey results, and (c) UCL results under 808 nm excitation with a power density of 1.5 W $cm^{-2}$.
Figure 6B:
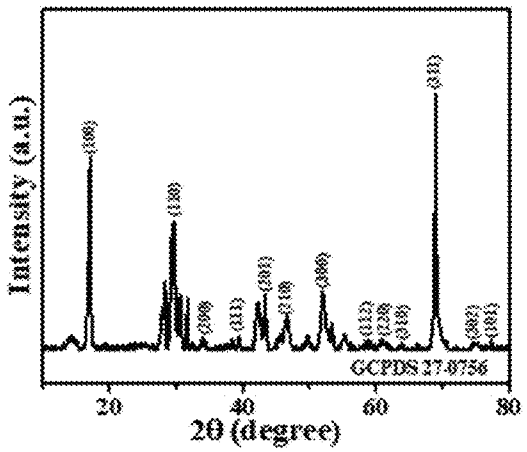
Figure 6C:
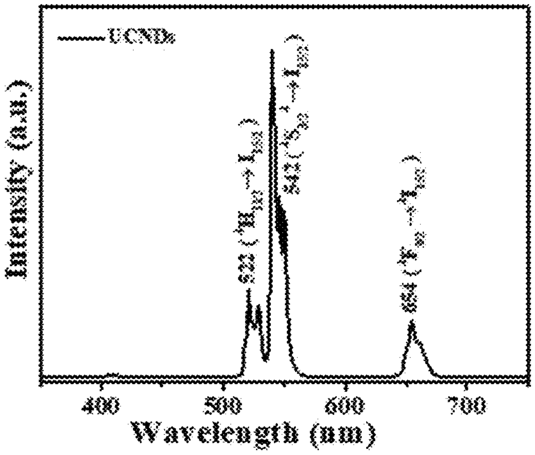

FIG. 6A shows the absorbance of the as-synthesized sandglass-like nanoarchitectonics, which showed the multiple absorption peaks from 500 nm to 900 nm. The maximum absorption was achieved ta 580, 750, 800, and 860 nm. FIG. 6*a* shows XRD diffraction patterns of the as-synthesized star-like nanoarchitectonics, which showed the main diffraction patterns of $NaNdF_4$ with major peaks assigned to {311}, {110} and {100} planes along with some $NaYF_4$ peaks. FIG. 6B displays the XPS survey of the as-synthesized star-like-like nanoarchitectonics, which depicted the presence of Y 3d, Er 4d, Yb 4d, C 1s, Na KLL, O 1s, F 1s, F KLL, Nd 3d, and Na 1s spectra indicated the formation of multilayered nanoarchitectonics. FIG. 6C shows upconversion luminescence (UCL) of the as-synthesized star-like nanoarchitectonics, which exhibited multimission peaks assigned to green emission at 522 of ($^4H_{11/2}$→$^4I_{15/2}$) and 542 nm of ($^4S_{3/2}$→$^4I_{15/2}$) along with a red emission peak at 654 nm of ($^4F_{9/2}$→$^4I_{15/2}$) transition.

Figure 7A:
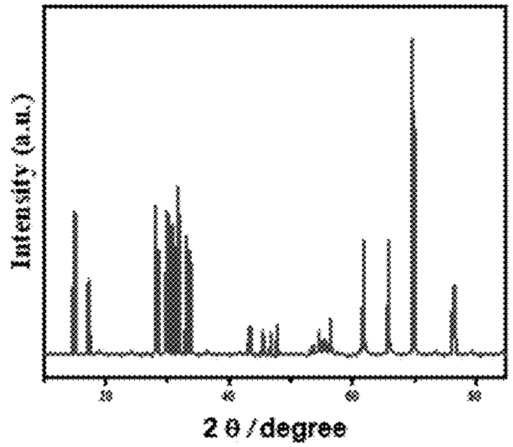
FIGS. 7A-7C show additional experimental data for core-shell hexagonal nanoarchitectonics, with (a) an XRD spectrum of the core-shell hexagonal structure, (b) XPS survey results, and (c) UCL results under 808 nm excitation with a power density of 1.5 W $cm^{-2}$.
Figure 7B:
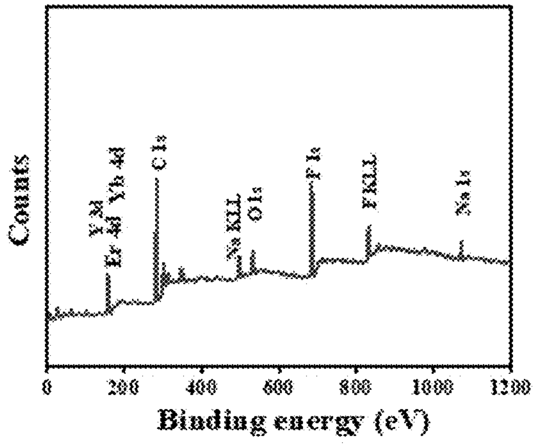
Figure 7C:
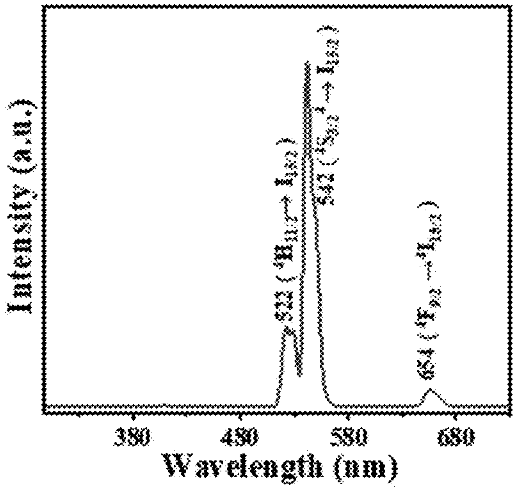

FIG. 7A shows XRD diffraction patterns of the as-synthesized hexagonal core-shell nanoarchitectonics, which showed the main diffraction patterns of $NaYF_4$ peaks. FIG. 7B displays the XPS survey of the as-synthesized hexagonal core-shell nanoarchitectonics, which depicted the presence of Y 3d, Er 4d, Yb 4d, C 1s, Na KLL, O 1s, F 1s, F KLL, and Na 1s spectra indicated the formation of multilayered nanoarchitectonics. FIG. 7C shows upconversion luminescence (UCL) of the as-synthesized hexagonal core-shell nanoarchitectonics, which exhibited multisession peaks assigned to green emission at 522 of ($^4H_{11/2}$→$^4I_{15/2}$) and 542 nm of ($^4S_{3/2}$→$^4I_{15/2}$) along with a red emission peak at 654 nm of ($^4S_{3/2}$→$^4I_{15/2}$) transition.

Figure 8A:
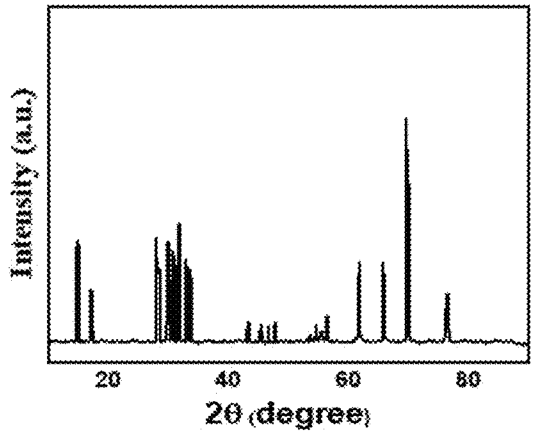
FIGS. 8A-8C show additional experimental data for semispherical nanoarchitectonics, with (a) an XRD spectrum of the semispherical structure, (b) XPS survey results, and (c) UCL results under 808 nm excitation with a power density of 1.5 W $cm^{-2}$.
Figure 8B:
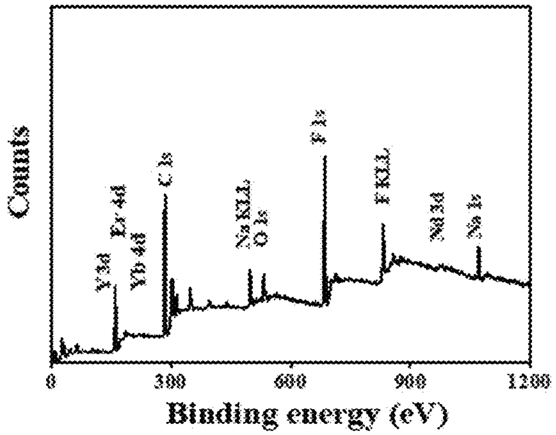
Figure 8C:
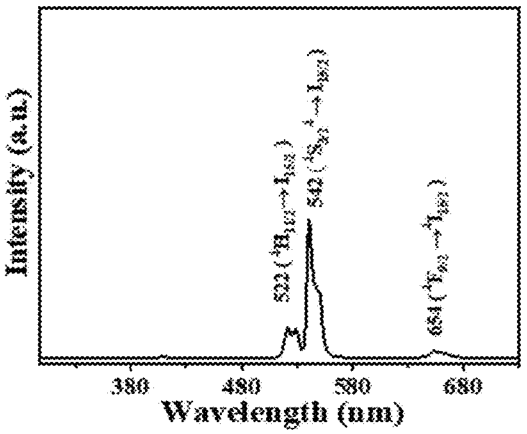
Figure 9A:
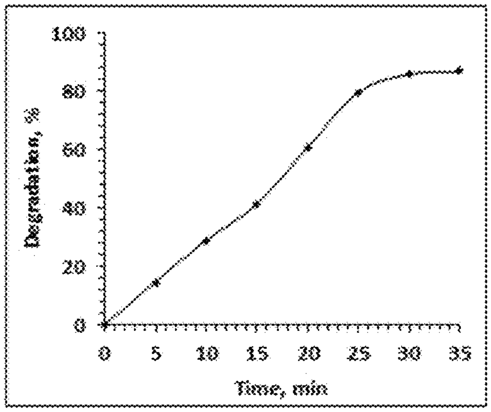
FIGS. 9A-9B show the results of photocatalytic phenol degradation on multilayered, multidimensional $NaYF_4$: Yb,Er,Ca@$NaYF_4$: Yb,Ca@$NaNdF_4$:Yb, sandglass-like (90% Nd) nanoarchitectonics (a) with $H_2O_2$ and (b) without $H_2O_2$.
Figure 9B:
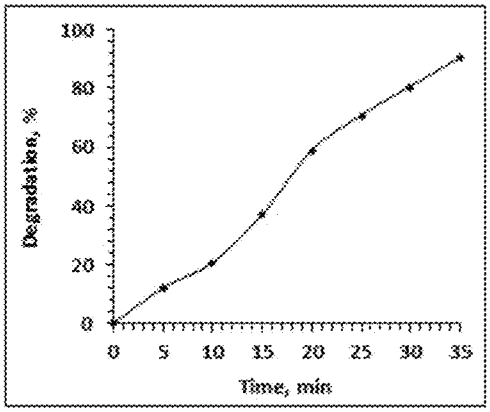
Figure 10A:
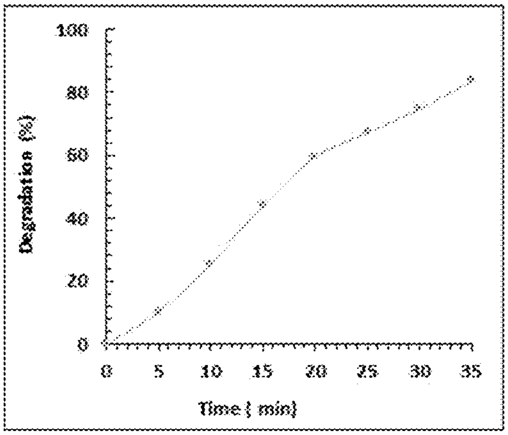
FIGS. 10A-10B show the results of photocatalytic phenol degradation on multilayered, multidimensional $NaYF_4$: Yb,Er, C a@$NaYF_4$: Yb, C a@$NaNdF_4$:Yb, sandglass-like (80% Nd) nanoarchitectonics (a) without $H_2O_2$ and (b) with $H_2O_2$.
Figure 10B:
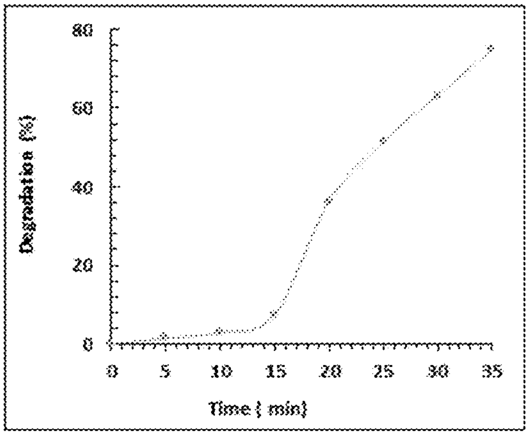
Figure 11A:
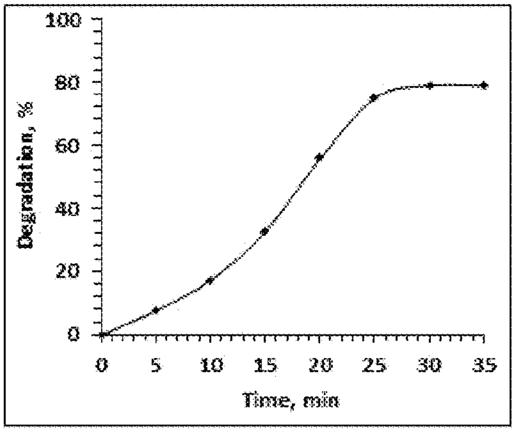
FIGS. 11A-11B show the results of photocatalytic phenol degradation on multilayered, multidimensional $NaYF_4$: Yb,Er,Ca@$NaYF_4$: Yb,Ca@$NaNdF_4$:Yb, sandglass-like (60% Nd) nanoarchitectonics (a) without $H_2O_2$ and (b) with $H_2O_2$.
Figure 11B:
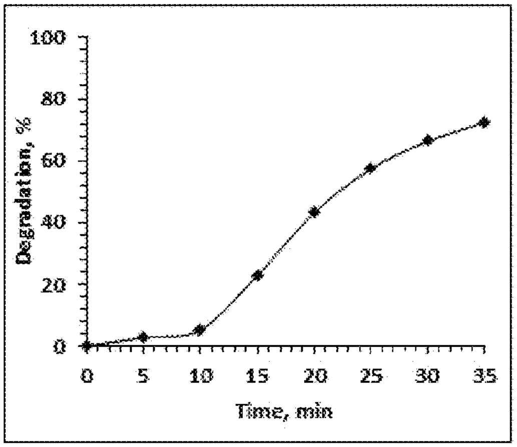
Figure 12A:
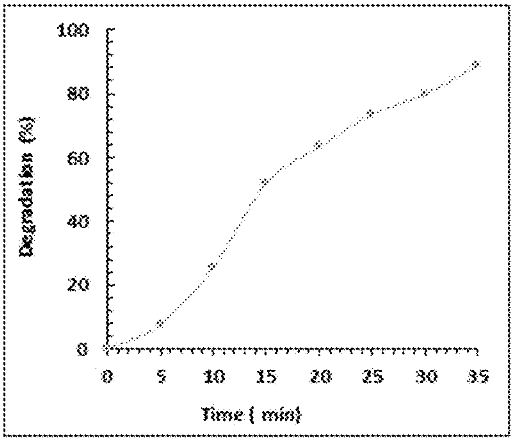
FIGS. 12A-12B show the results of photocatalytic phenol degradation on multilayered, multidimensional $NaYF_4$: Yb,Er,Ca@$NaYF_4$: Yb,Ca@$NaNdF_4$:Yb, sandglass-like (40% Nd) nanoarchitectonics (a) without $H_2O_2$ and (b) with $H_2O_2$.
Figure 12B:
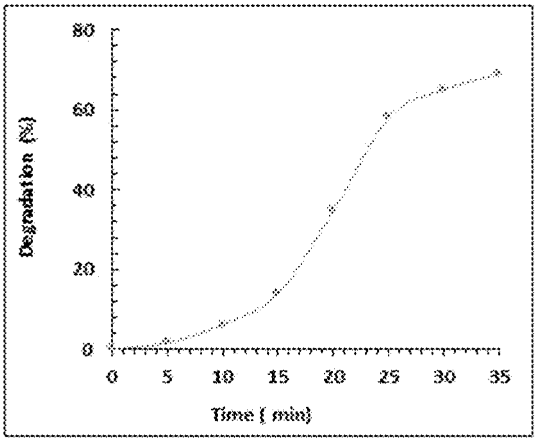
Figure 13A:
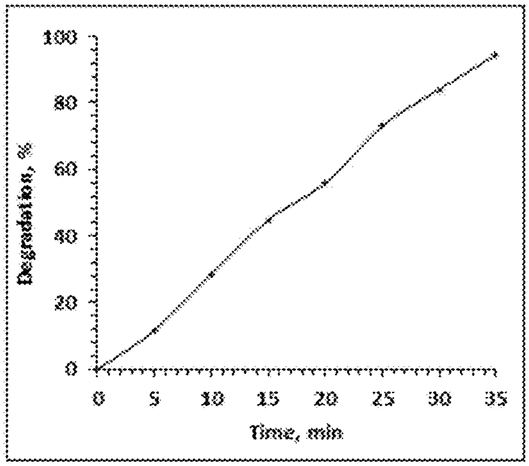
FIGS. 13A-13B show the results of photocatalytic phenol degradation on multilayered, multidimensional $NaYF_4$: Yb,Er, C a@$NaYF_4$: Yb, C a@$NaNdF_4$:Yb, spatical star-like (80% Nd) nanoarchitectonics (a) without $H_2O_2$ and (b) with $H_2O_2$.
Figure 13B:
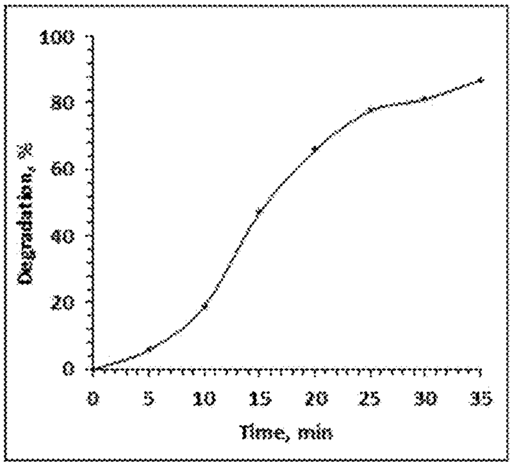
Figure 14A:
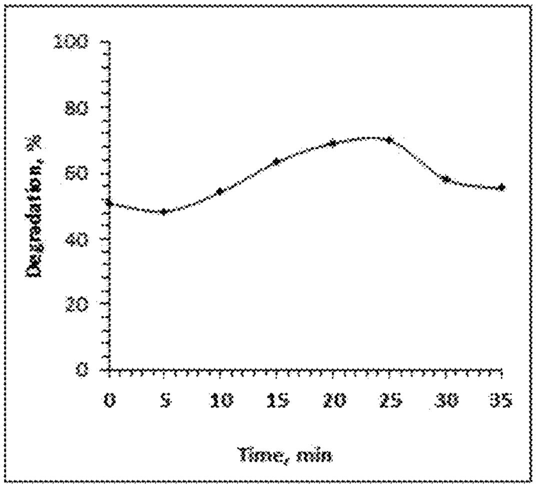
FIGS. 14A-14B show the results of photocatalytic phenol degradation on multilayered, multidimensional $NaYF_4$:Yb, Er,Ca@$NaYF_4$:Yb,Ca core-shell hexagonal nanostructure (a) with $H_2O_2$ and (b) without $H_2O_2$.
Figure 14B:
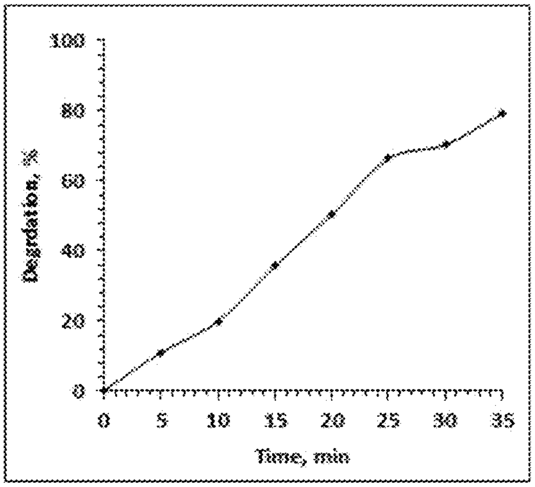
Figure 15A:
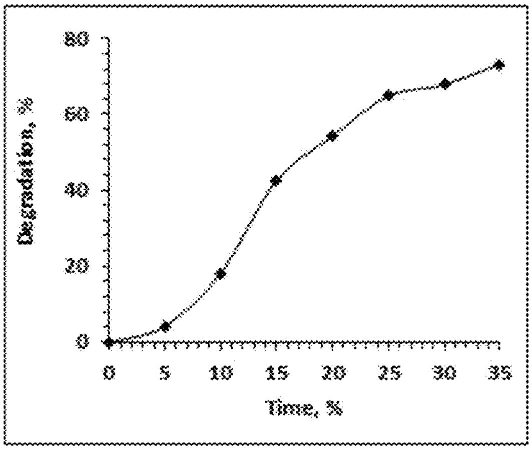
FIGS. 15A-15B show the results of photocatalytic phenol degradation on multilayered, multidimensional $NaYF_4$: Yb,Er,Ca@$NaYF_4$:Yb,Ca core-shell octagonal nanostructure (a) without $H_2O_2$ and (b) with $H_2O_2$.
Figure 15B:
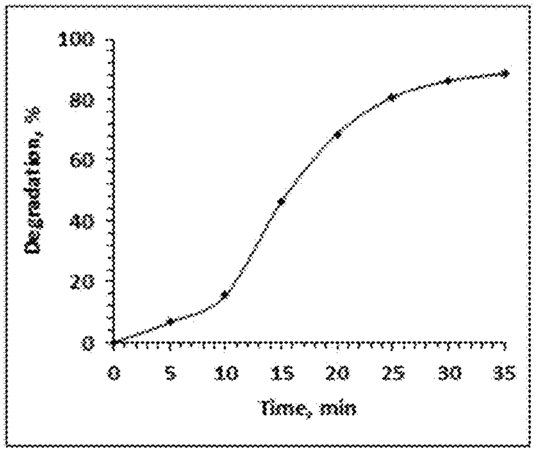
Figure 16A:
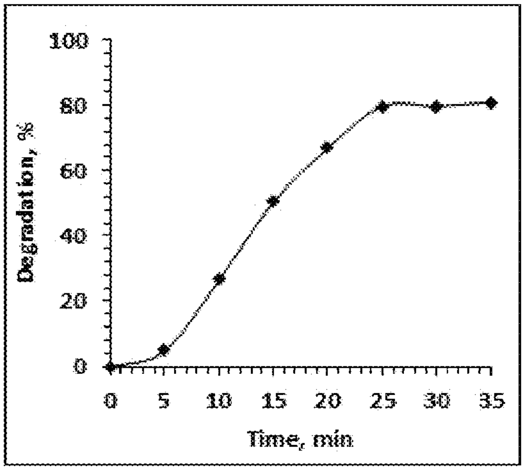
FIGS. 16A-16B show the results of photocatalytic phenol degradation on $NaYF_4$:Yb,Er,Ca semispherical core photocatalyst (a) without $H_2O_2$ and (b) with $H_2O_2$.
Figure 16B:
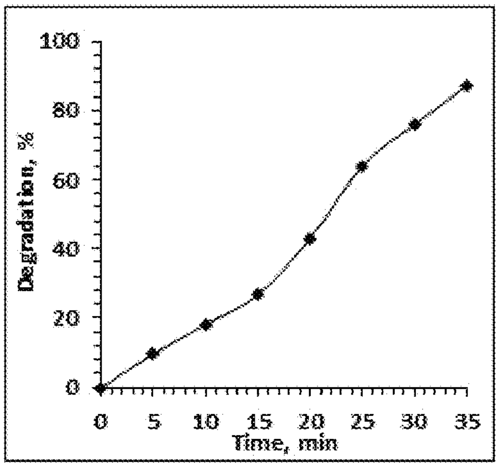
Figure 17:
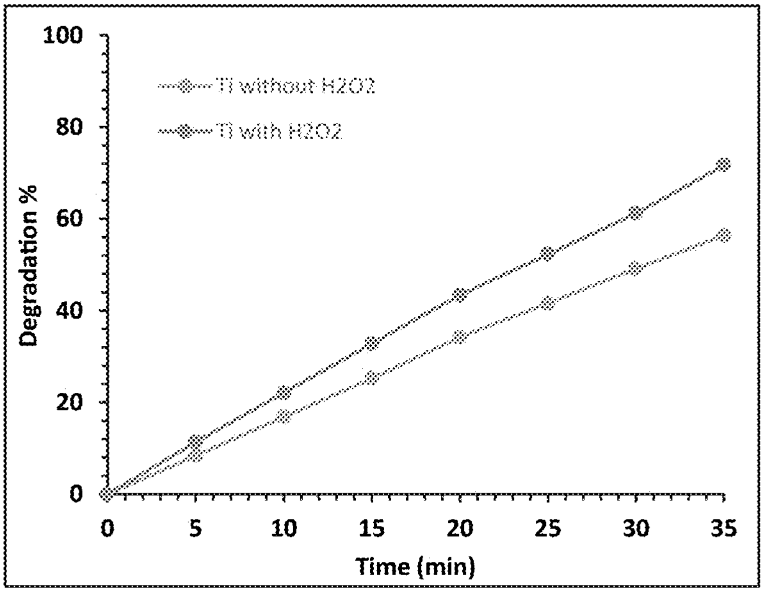
FIG. 17 shows photocatalytic phenol degradation on commercial $TiO_2$ nanoparticle photocatalyst with and without $H_2O_2$.

FIG. 8A shows XRD diffraction patterns of the as-synthesized semispherical core nanoparticles, which showed the main diffraction patterns of $NaYF_4$ peaks. FIG. 8B displays the XPS survey of the as-synthesized hexagonal core-shell nanoarchitectonics, which depicted the presence of Y 3d, Er 4d, Yb 4d, C 1s, Na KLL, O 1s, F 1s, F KLL, and Na 1s spectra. FIG. 8C shows upconversion luminescence (UCL) of the as-synthesized semispherical core nanoparticles, which exhibited multisession peaks assigned to green emission at 522 of ($^4H_{11/2}$→$^4I_{15/2}$ and 542 nm of ($^4S_{3/2}$→$^4I_{15/2}$) along with a red emission peak at 654 nm of ($^4F_{9/2}$→$^4I_{15/2}$) transition.

Example 6: Photocatalytic Phenol Degradation

The photocatalytic phenol degradation process was carried out using the advanced oxidation process using the photochemical reactor (Toption instrument Co. LTD, China), potentiostat (Gamry, USA), electrochemical oxidation reactors. An aqueous solution (100 mL) contains 5 mg/L of phenol was under magnetic stirring at room temperature in the presence of 0.1 g of photocatalysts (contain 0.1% of upconversion) in a dark chamber followed by illumination with a 150 W Xenon lamp (12 mW cm'). Then 3 mL of water were withdrawn every 8 min, filtered using a Whatman nylon filter paper (0.2 μm), and its absorbance was recorded using UV-vis spectra at 269 nm. The degradation percentage ($D_{100}$) of phenol was calculated using this equation "$D_{100}$=[$(C_0-C_t)/C_o$]×100" where $C_0$ and $C_t$ are initial concentration and concentration after time, respectively.

For the measurements under ozone, the ozone was in situ generated electrochemically using a $SiO_2/Ti_3$ 00 nm/Pt100 nm/TiOx100 nm/SnOx500 nm electrode in an aqueous solution 0.5 M NaOH at 8 V, 3000 mA and ozone concertation was monitored using (Ecosensors & 2B Technologies, USA).

The phenol photocatalytic degradation was carried out on the as-synthesized photocatalysts in the presence and in the absence of $H_2O_2$ (FIG. 9 to FIG. 16). All experiments were performed using 0.1 g of $TiO_2$ as support and 0.1% of the upconversion as a photocatalyst. In the presence of $H_2O_2$, only 70 μl of $H_2O_2$. The results were compared to commercial $TiO_2$.

Table 1 provides a comparison between some photocatalysts of the present invention and previously reported photocatalysts with and without upconversion nanoparticles or elements. The results displayed the superior photocatalytic phenol degradation performance of the upconversion than that of $TiO_2$, as indicated by the greater degradation percentage under the same conditions (Table 1). In addition, the performance of the upconversion photocatalyst without using $H_2O_2$ was significantly higher than that of using $H_2O_2$ (Table 1). It should be noticed that the photocatalytic performance of thus synthesized upconversion photocatalysis was substantially higher than that of all previously reported photocatalysis (Table 1).

TABLE 1

Photocatalyst Comparison

| Sample | | Phenol (concentration (mg/L) | Time (min) | Degradation (%) | Ref. |
|---|---|---|---|---|---|
| Sandglass-like upconversion Nd 90% | Xenon lamp 350 nm Without $H_2O_2$ | 20 mg/L | 35 | 90.21739 | Embodiment of invention |
| Sandglass-like upconversion Nd 80% | Xenon lamp 350 nm | 20 mg/L | 35 | 81.63265 | Embodiment of invention |
| Sandglass-like upconversion Nd 60% | Without $H_2O_2$ | 20 mg/L | 35 | 78.84615 | Embodiment of invention |
| $NaYF_4$:Yb/Tm@$TiO_2$/RGO (5) | 2 W 980 nm laser | 20 mg/L | 12 h | (20/5) | A |
| $Er^{3+}$-doped $Bi_2WO_6$ | Xe lamp (500 W) | 20 mg/L | 180 min | 15% | B |
| $Er^{3+}$-doped $Bi_2WO_6$ | 3 W LED | 20 mg/L | 60 h | 40% | B |
| $NaYF_4$:Yb/Tm@$TiO_2$ | 980 nm laser | 20 mg/10 ml | 1 h | 17% | C |
| $TiO_2$ Yb(1.0 mol %) | Visible irradiation (>450 nm) | 0.21 mM/5.0 mL | 3 h | 89% | D |
| $TiO_2$ Y(0.25) HT | UV-vis irradiation | 0.21 mM/25 mL | 1 h | 3.85 | E |
| $TiO_2$ Y(0.5) SG | vis irradiation (>420 nm) | 0.21 mM/25 mL | 1 h | 0.26 | E |
| $Er^{3+}$:$Y_3A_{15}O_{12}$/$Bi_2WO_6$ | 500 W Xe lamp | 20 mg/L | 2 h | 51.0% | F |
| $Er^{3+}$ doped $Bi_2MoO_6$ nanosheets | 350 W Xe lamp | 20 mg/L | 2 h | 46.4% | G |
| $TiO_2$ Er (2 mol %) | UV-vis-NIR | 30 ppm | 2 h | 6% | H |
| Ho—$TiO_2$ nanotube | visible light (LEDs max = 465 nm) | 30 ppm | 1 h | 30% | I |
| 2%$Er^{3+}$—$TiO_2$ | UV-vis-NIR | 30 ppm | 2 h | 90% | J |
| Doping $Er^{3+}$ and $YAlO_3$ into $TiO_2$ (VPCB) | visible-light | 0.6 mg/L | 16 h | 99.8% | K |
| Doping $Er^{3+}$ and $YAlO_3$ into $TiO_2$ (UPCB) | UV light | 0.6 mg/L | 16 h | 67.2% | K |
| $NaYF_4$:$Yb^{3+}$, $Tm^{3+}$/g-$C_3N_4$ (NYT/$C_3N_4$)-15 wt % | 980 nm laser irradiation | 50 ppm | 12 h | 50% | L |

For Table 1, "A" corresponds to W. Wang et al., *Applied Catalysis B: Environmental,* 2016, 182, 184-192. "B" corresponds to Z. Zhang et al., *Applied Catalysis B: Environmental,* 2010, 101, 68-73. "C" corresponds to W. Wang et al., *Applied Catalysis B: Environmental,* 2014, 144, 379-385. "D" corresponds to J. Reszczyliska et al., *Applied Catalysis B: Environmental,* 2015, 163, 40-49. "E" corresponds to J. Reszczyliska et al., *Applied Catalysis B: Environmental,* 2016, 181, 825-837. "F" corresponds to Z. Zhang et al., Catalysis Communications, 2011, 13, 31-34. "G" corresponds to T. Zhou et al., *Applied Catalysis B: Environmental,* 2011,110, 221-230. "H" corresponds to S. Obregon et al., Journal of catalysis, 2013, 299, 298-306. "I" corresponds to P. Mazierski et al., *Applied Catalysis B: Environmental,* 2017, 205, 376-385. "J" corresponds to S. Obregon and G. Colon, Chemical communications, 2012, 48, 7865-7867. "K" corresponds to D. Zhou et al., Environmental science & technology, 2015, 49, 7776-7783. "L" corresponds to M.-Z. Huang et al., Journal of colloid and interface science, 2015, 460, 264-272.

Table 2 provides a comparison of the photocatalytic phenol degradation on the as-synthesized upconversion photocatalysts with and without $H_2O_2$ compared to commercial $TiO_2$.

TABLE 2

Photocatalyst Comparison II

| Photocatalysts | Time (min) | Degradation (%) With Using $H_2O_2$ |
|---|---|---|
| Commercial $TiO_2$ | 35 | 71.70266 |
| Star-like upconversion | 35 | 94.47514 |
| Octahedral core-shell upconversion | 35 | 86.9281 |
| Hexagonal core-shell upconversion | 35 | 88.55422 |
| Semispherical core upconversion | 35 | 90 |
| Sandglass-like upconversion Nd 90% | 35 | 86.72986 |
| Sandglass-like upconversion Nd 80% | 35 | 82.5 |

TABLE 2-continued

Photocatalyst Comparison II

| | | |
|---|---|---|
| Sandglass-like upconversion Nd 60% | 35 | 72.56637 |
| Sandglass-like upconversion Nd 40% | 35 | 68.99225 |

| Sample | Time (min) | Degradation (%) Without $H_2O_2$ |
|---|---|---|
| Commercial $TiO_2$ | 35 | 56.39535 |
| Star-like upconversion | 35 | 87.05882 |
| Semispherical core upconversion | 35 | 81.01266 |
| Hexagonal core-shell upconversion | 35 | 73.40426 |
| Star-like upconversion Nd 80% | 35 | 83.5443 |
| Sandglass-like upconversion Nd 90% | 35 | 90.21739 |
| Sandglass-like upconversion Nd 80% | 35 | 81.63265 |
| Sandglass-like upconversion Nd 60% | 35 | 78.84615 |
| Sandglass-like upconversion Nd 40% | 35 | 88.60759 |
| UCCK's Core-Shell | 35 | 79.20792 |

All publications, patents, and patent applications mentioned in this specification are indicative of the level of skill of those skilled in the art to which the invention pertains, and they are herein incorporated by reference to the same extent as if each were set forth in full.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A method for degrading a phenolic pollutant in a medium, the method comprising exposing a mixture of the medium and a multi-layered upconversion nanoparticle to light, wherein the multi-layered upconversion nanoparticle comprises an active core, wherein the active core comprises Er;

an intermediate layer, wherein the intermediate layer comprises Yb; and an exterior layer; wherein the intermediate layer is between the active core and the exterior layer, and wherein the exterior layer comprises Nd.

2. The method of claim 1, wherein the phenolic pollutant is phenol.

3. The method of claim 1, wherein the phenolic pollutant is a dye.

4. The method of claim 1, wherein the medium is wastewater.

5. The method of claim 1, wherein the light is visible light.

6. The method of claim 1, wherein the light is near infrared light (NIR).

* * * * *